Patented Sept. 19, 1933

1,927,540

UNITED STATES PATENT OFFICE 1,927,540

LINOLEUM CEMENT

Robert D. Bonney, Glen Ridge, and Walter S. Egge, Newark, N. J., assignors to Congoleum-Nairn, Inc., a corporation of New York No Drawing. Application November 4, 1930
Serial No. 493,462

3 Claims. (Cl. 87—17)

The present invention relates to the manufacture of linoleum and more particularly to the manufacture of an oxidized oil cement forming the binder constituent of linoleum.

It is well known that linoleum, as heretofore produced, possesses the undesirable property of losing its initial flexibility to a marked degree through aging, and of becoming too brittle and inflexible to be easily handled and installed after a relatively short period. Furthermore, it has been an accepted principle that high flexibility even in freshly seasoned linoleum could be obtained only by increasing substantially the proportion of cement or binder constituent. Such practice is wholly impracticable as it entails numerous manufacturing difficulties and involves an almost prohibitive cost. Our invention has for one object to overcome these deficiencies and to provide a linoleum which, for the optimum cement content, is characterized by substantially increased initial flexibility and which, at the same time, possesses the requisite degree of toughness. A further object is to provide a linoleum which will retain such flexibility over a long period. We have found that these objects may be obtained by following the teaching of our invention in the preparation of the cement which is used in the manufacture of the linoleum.

Broadly, our invention comprises forming linoleum cement in accordance with any of the conventional processes and treating such cement by incorporating therewith a small amount, i. e., .5% to 3.0%, of acetic acid.

In carrying out the process of our invention, the linoleum cement is first prepared in any conventional manner. For example, the cement may be prepared by the two stage process which comprises oxidizing a drying oil, usually linseed oil, together with suitable metallic driers such as manganese resinate or litharge, and fluxing the oxidized and solidified oil with rosin and gums. Preferably, however, the cement is formed by the single stage process which consists in oxidizing a mix comprising a drying oil such as linseed oil, with or without the addition of a semi-drying oil, resinous material, usually rosin, and suitable metallic driers such as manganese resinate or litharge. It is to be understood that so much of our process follows the conventional practices of the prior art and may employ any or all of the usual materials and methods. Thus, while rosin is the most commonly used material to be combined with the oxidized oil in forming linoleum cement, other resinous materials which are frequently substituted, in whole or in part therefor, include East India gum, kauri gum, Congo gum, and damar resin. The expression "rosin" is intended to include these recognized equivalents.

The cement prepared by either of the above processes is next treated in accordance with our invention by incorporating therewith .5% to 3.0% of glacial acetic acid. Preferably, this operation is carried out independently of succeeding operations, the acetic acid and cement being thoroughly milled together to effect an intimate mixture thereof. The linoleum cement thus prepared and treated is then utilized in the usual manner for the manufacture of linoleum composition by admixing therewith filler materials such as cork, wood flour, and pigments, and processing in accordance with the conventional practice.

While we prefer to incorporate the acetic acid with the cement prior to, and independently of, the addition of the filler materials as above described, it is also within the purview of our invention to effect the incorporation of the acetic acid with the cement simultaneously with the admixture of the filler materials. When following this alternative procedure, however, it will be found advisable, in order to secure the incorporation of the optimum amount of acetic acid in the cement, to increase the amount added to the mix since a portion thereof will be absorbed by, or react with, the filler materials.

Linoleum produced with cement treated in accordance with our invention, is characterized by substantialy greater initial flexibility and by equal toughness and resistance to indentation and abrasion as compared with linoleum heretofore produced comprising an equivalent proportion of cement. Furthermore, the linoleum produced from such cement retains its initial flexibility over a long period, the tendency to become brittle and inflexible having been reduced to a minimum. These improvements greatly facilitate the installation of linoleum and obviously add to the other and well known desirable characteristics of the product.

The effect of the acetic acid in increasing and preserving the flexibility of linoleum manufactured with cement treated as described may be due to one or more physical or chemical reactions. The most probable explanation is that the acetic acid functions to increase the colloidal dispersion of the oxidized oil during and after seasoning and to thereby limit the proportion of solid linoxyn formed. Our invention, however, is not predicated upon this theory nor is it to be limited by it, for the beneficial results obtained by the process may be attributed to other and unknown reactions.

We claim:

1. The process of making linoleum cement which includes the steps of forming a cement comprising an oxidized drying oil and rosin; and milling into said cement .5% to 3.0% of acetic acid.

2. The process of making linoleum cement which includes the steps of oxidizing a mix comprising a drying oil, rosin, and driers; and milling into the oxidized mix .5% to 3.0% of acetic acid.

3. As a new article of manufacture, linoleum cement comprising an oxidized drying oil, rosin, and metallic driers, and .5% to 3.0% of acetic acid incorporated therewith.

ROBERT D. BONNEY.
WALTER S. EGGE.